US010064198B2

(12) United States Patent
Cui et al.

(10) Patent No.: US 10,064,198 B2
(45) Date of Patent: Aug. 28, 2018

(54) DEVICE IN WIRELESS COMMUNICATION SYSTEM, WIRELESS COMMUNICATION SYSTEM AND METHOD

(71) Applicant: SONY CORPORATION, Tokyo (JP)

(72) Inventors: Qimei Cui, Beijing (CN); Tong Zhang, Beijing (CN); Weijuan Gao, Beijing (CN); Hui Wang, Beijing (CN)

(73) Assignee: Sony Corporation, Tokyo (JP)

( * ) Notice: Subject to any disclaimer, the term of this patent is extended or adjusted under 35 U.S.C. 154(b) by 128 days.

(21) Appl. No.: 15/035,654

(22) PCT Filed: Nov. 28, 2014

(86) PCT No.: PCT/CN2014/092468
§ 371 (c)(1),
(2) Date: May 10, 2016

(87) PCT Pub. No.: WO2015/081811
PCT Pub. Date: Jun. 11, 2015

(65) Prior Publication Data
US 2016/0286562 A1 Sep. 29, 2016

(30) Foreign Application Priority Data

Dec. 6, 2013 (CN) .......................... 2013 1 0655275

(51) Int. Cl.
*H04W 72/08* (2009.01)
*H04W 72/04* (2009.01)
(Continued)

(52) U.S. Cl.
CPC .......... *H04W 72/082* (2013.01); *H04B 7/024* (2013.01); *H04W 28/0236* (2013.01); *H04W 72/042* (2013.01); *H04W 72/085* (2013.01)

(58) Field of Classification Search
None
See application file for complete search history.

(56) References Cited

U.S. PATENT DOCUMENTS

2013/0114517 A1* 5/2013 Blankenship ......... H04L 5/0053
370/329
2013/0114529 A1* 5/2013 Chen ..................... H04L 1/1812
370/329

(Continued)

FOREIGN PATENT DOCUMENTS

| CN | 102098720 A | 6/2011 |
| CN | 103298117 A | 9/2013 |
| CN | 103326809 A | 9/2013 |

OTHER PUBLICATIONS

International Search Report dated Mar. 2, 2015 for PCT/CN2014/092468 filed on Nov. 28, 2014.

*Primary Examiner* — Candal Elpenord
(74) *Attorney, Agent, or Firm* — Xsensus, LLP

(57) ABSTRACT

A wireless communication system, wireless communication system and method, the device on the base station side in the wireless communication system including: an edge user equipment (UE) identification unit configured to identify the edge UE on the enhanced physical downlink control channel (EPDCCH) according to the information about the UE received from the UE; and an interference coordination unit configured to apply an interference coordination plan to the EPDCCH of the edge UE. Applying the interference coordination plan to the EPDCCH of the edge UE improves service quality of the edge UE; and setting a proper degree of enhanced control channel element aggregation for the edge UE reduces the number of blind tests of the UE, thus increasing the system response speed.

14 Claims, 10 Drawing Sheets

(51) Int. Cl.
*H04B 7/02* (2018.01)
*H04W 28/02* (2009.01)
*H04B 7/024* (2017.01)

(56) References Cited

U.S. PATENT DOCUMENTS

| | | | |
|---|---|---|---|
| 2014/0036789 A1* | 2/2014 | Miao | H04W 72/04 |
| | | | 370/329 |
| 2014/0192734 A1* | 7/2014 | Ng | H04L 5/0035 |
| | | | 370/329 |
| 2014/0233407 A1* | 8/2014 | Pourahmadi | H04L 5/0007 |
| | | | 370/252 |
| 2014/0301286 A1* | 10/2014 | Abe | H04L 5/0023 |
| | | | 370/329 |

* cited by examiner

DEVICE IN WIRELESS COMMUNICATION SYSTEM, WIRELESS COMMUNICATION SYSTEM AND METHOD

FIELD OF THE INVENTION

The disclosure relates to the field of wireless communication technology, and more particularly to a device on base station side and a device on user equipment side in a wireless communication system, a wireless communication system and method.

BACKGROUND OF THE INVENTION

In LTE Release 8/9/10, a physical downlink control channel (PDCCH) adopting techniques such as dynamic indication, implicit addressing, blind detection, full bandwidth diversity transmission and so on mainly for a scenario of homogeneous macro cellular networking has been proved to have excellent operating performance. In these systems, however, the PDCCH occupies one to three orthogonal frequency division multiplexing (OFDM) symbols (occupies two to four OFDM symbols in the case of a system bandwidth of 1.4 MHz), and downlink control information sent on each subframe is limited. However, with the introduction of a scenario of heterogeneous networking and the application of new techniques such as coordinated multipoint transmission (CoMP), inter-cell interference coordination (eICIC), carrier aggregation (CA) and so on in an LTE-advanced Release 11 (LTE-A R11) system, there has been an extremely increasing demand for control signaling, so the capacity of a downlink control channel becomes one of notable bottlenecks of system performance. Besides, the PDCCH performs diversity transmission with full bandwidth, thus causing a problem of failing to further obtain a beamforming gain, a frequency selective gain and the like brought about by transmission techniques such as downlink Multi-Input Multi-Output (MIMO) Beamforming and so on. Therefore, 3GPP RAN1 working group introduces an enhanced physical downlink control channel (EPDCCH) technique in standard customization for R11.

As shown in FIG. 1, the EPDCCH does not occupy resources of the PDCCH, but performs frequency division multiplexing with a physical downlink shared channel (PDSCH); that is, only the EPDCCH or the PDSCH is transmitted within one pair of physical resource blocks (PRBs) (resource blocks occupying 12 sub-carriers in frequency domain and occupying two time slots in time domain), thereby making it possible to obtain beamforming and diversity gains, increasing flexibility in interference cancellation on a control channel in heterogeneous networks and ensuring excellent coverage. The EPDCCH is one of important physical channels in LTE-A system, and it carries contents including some broadcast system information, paging instructions sent to some user equipment (UE), indication of resource positions of UE data channels, indication of modulation and encoding manners of UE data channel transmission, hybrid automatic repeat request (HARQ) information and uplink power control and the like. Therefore, whether or not signaling transmission on the EPDCCH is accurate directly determines the performance of the overall system. However, in the scenario of heterogeneous networking in the LET-A system, the introduction of small-power base stations such as Pico base stations, Femto base stations and so on causes the cell system capacity and the edge coverage to be improved greatly but causes the structure of inter-cell interference to become more complicated; and the existing interference coordination scheme on the control channel is too simple to satisfy requirements. Therefore, it is greatly desired to introduce a new interference coordination scheme on the control channel, so as to support accurate transmission of control channel signaling efficiently.

In addition, a reception speed of the EPDCCH of LTE-A serving as a core of system resource allocation and control information scheduling influences a response speed of the system greatly. A terminal detects control information on the EPDCCH by adopting blind detection, so it is necessary to adopt an effective mechanism to reduce the number of times of blind detection, making it possible to improve the response speed of the overall system. The EPDCCH comprises enhanced control channel elements (ECCEs), for carrying downlink control information (DCI), and the number of the ECCEs which constitute the DCI is called an ECCE aggregation level. Since there has been an extremely increasing demand for control signaling so that the capacity of the downlink control channel becomes one of notable bottlenecks of system performance, the EPDCCH is introduced, it is significant to reduce the ECCE aggregation level as much as possible, so as to save the space of the EPDCCH and thereby increase the network capacity.

According to the prior art, the ECCE aggregation level of the EPDCCH is controlled based on downlink quality information such as channel quality indication (CQI) and reference signal receiving power (RSRP) fed back by the user equipment, so as to ensure the reliability of the EPDCCH. For example, for the CQI scheme, a network layer may set mapping relationship between CQI values (0-15) and ECCE aggregation levels (1, 2, 4, 8, 6, 32), and a base station determines an aggregation level to be adopted based on the CQI fed back by the user equipment and the CQI-ECCE aggregation level mapping relationship; and for the RSRP scheme, an RSRP intensity threshold required by each ECCE aggregation level is necessarily determined, and an ECCE aggregation level for which an RSRP intensity threshold is less than the RSRP of the user equipment is selected to be used. However, upon adoption of for example coordinated multipoint transmission or other interference coordination schemes on the EPDCCH, actual receiving power of the user equipment and channel condition are very complicated, and thus both the schemes of determining the ECCE aggregation level are not applicable. In addition, a more flexible ECCE aggregation level adjustment scheme is also desired to satisfy different Quality-of-Service (QoS) requirements of the user.

SUMMARY OF THE INVENTION

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the foregoing, an object of the disclosure is to provide a wireless communication technique of applying an interference coordination scheme to an EPDCCH, thereby making it possible to support accurate transmission of control channel signaling efficiently, so as to improve the performance of edge user equipment. In addition, since the service quality of the edge user equipment can be improved upon the application of the interference coordination scheme, the ECCE aggregation level of the edge user equipment can be set properly in a wireless communication system, so as to save the space of the EPDCCH, increase the network capacity, and reduce the number of times of blind detection performed by the terminal, thereby improving the response speed of the overall system.

According to one aspect of the disclosure, there is provided a device on base station side in a wireless communication system, and the device may include: an edge user equipment identifying unit configured to identify, according to information about user equipment received from the user equipment, edge user equipment on an enhanced physical downlink control channel (EPDCCH); and an interference coordinating unit configured to apply an interference coordination scheme to the EPDCCH of the edge user equipment.

According to a preferred embodiment of the disclosure, the device on base station side may further include: an enhanced control channel element (ECCE) aggregation level setting unit configured to set an ECCE aggregation level for the edge user equipment according to the applied interference coordination scheme.

According to another preferred embodiment of the disclosure, the ECCE aggregation level setting unit may be further configured to set an ECCE aggregation level candidate set, which is smaller than that when the interference coordination scheme is not applied on the EPDCCH, for the edge user equipment. Alternatively, the ECCE aggregation level setting unit may be further configured to set an ECCE aggregation level reduction for the edge user equipment, in which the ECCE aggregation level reduction indicates a reduction in level as compared with the ECCE aggregation level being set when the interference coordination scheme is not applied on the EPDCCH.

According to another preferred embodiment of the disclosure, the interference coordination scheme may include at least one of a Coordinated Multipoint (CoMP) transmission scheme and an Almost Blank Subframe (ABS) scheme.

According to another preferred embodiment of the disclosure, the CoMP transmission scheme may further include at least one of Joint Processing (JP) and Coordinated Scheduling/Coordinated Beamforming (CS/CB). Preferably, the interference coordinating unit may be further configured to select and apply the CoMP transmission scheme according to a channel quality of a single cell where the edge user equipment locates and a predetermined channel quality determined based on a Quality-of-Service requirement.

According to another preferred embodiment of the disclosure, the ECCE aggregation level setting unit may be further configured to determine, according to improvement in a channel quality of the EPDCCH when applying the interference coordination scheme on the EPDCCH as compared with that when the interference coordination scheme is not applied, a degree of decrease of the ECCE aggregation level candidate set or the ECCE aggregation level reduction.

According to another preferred embodiment of the disclosure, the ECCE aggregation level setting unit may be further configured to adjust the ECCE aggregation level for the edge user equipment according to a Quality-of-Service requirement of the edge user equipment.

According to another preferred embodiment of the disclosure, the ECCE aggregation level setting unit may be further configured to increase, for central user equipment other than the edge user equipment, the ECCE aggregation level according to a Quality-of-Service requirement of the central user equipment.

According to another preferred embodiment of the disclosure, the device on base station side may further include: a coordinated cell determining unit configured to determine a coordinated cell according to a channel quality of the EPDCCH of the edge user equipment when each cell coordinates with a cell where the edge user equipment locates. Preferably, the ECCE aggregation level setting unit may be further configured to set the ECCE aggregation level for the edge user equipment according to the determined coordinated cell.

According to another preferred embodiment of the disclosure, the device on base station side may further include: an allocating unit configured to allocate EPDCCH space saved according to the ECCE aggregation level set for the edge user equipment to other user equipment in the cell where the edge user equipment locates or user equipment in other cells.

According to another preferred embodiment of the disclosure, the device on base station side may further include: a user equipment notifying unit configured to notify the user equipment of the applied interference coordination scheme, information about the coordinated cell and/or the set ECCE aggregation level.

According to another preferred embodiment of the disclosure, the edge user equipment identifying unit may be further configured to determine the edge user equipment according to a Quality-of-Service requirement of the user equipment.

According to another aspect of the disclosure, there is further provided a device on user equipment side in a wireless communication system, and the device may include: a sending unit configured to send information about the user equipment to the device on base station side; a receiving unit configured to receive, if the device on base station side determines the user equipment as edge user equipment according to the received information, information about an applied interference coordination scheme and a coordinated cell for a cell where the user equipment locates from the device on base station side; and an executing unit configured to perform blind detection for control information on an enhanced physical downlink control channel (EPDCCH) received from base stations of the cell where the user equipment locates and the coordinated cell.

According to a preferred embodiment of the disclosure, the executing unit may start in priority blind detection from an enhanced control channel element (ECCE) aggregation level lower than that when the interference coordination scheme is not applied on the EPDCCH.

According to another preferred embodiment of the disclosure, the device on user equipment side may further include: an ECCE aggregation level receiving unit configured to receive from the device on base station side an ECCE aggregation level candidate set which is smaller than that when the interference coordination scheme is not applied on the EPDCCH or an ECCE aggregation level reduction for the user equipment, in which the ECCE aggregation level reduction indicates a reduction in level as compared with the ECCE aggregation level being set when the interference coordination scheme is not applied on the EPDCCH. Preferably, the executing unit may be further configured to perform blind detection according to the ECCE aggregation level candidate set or the ECCE aggregation level reduction.

According to another preferred embodiment of the disclosure, the device on user equipment side may further include: a Quality-of-Service (QoS) requirement reporting unit configured to report a QoS requirement of the user equipment to the device on base station side to be used for determining the applied interference coordination scheme and/or the ECCE aggregation level for the user equipment.

According to another aspect of the disclosure, there is further provided a wireless communication system, and the wireless communication system may include the device on base station side and the device on user equipment side.

According to another aspect of the disclosure, there is further provided a method for use in a wireless communication system, and the method may include: an edge user equipment identifying step of identifying, according to information about user equipment received from the user equipment, edge user equipment on an enhanced physical downlink control channel (EPDCCH); and an interference coordinating step of applying an interference coordination scheme to the EPDCCH of the edge user equipment.

According to another aspect of the disclosure, there is further provided a method for use in a wireless communication system, and the method may include: a sending step of sending information about user equipment to the device on base station side; a receiving step of receiving, if the device on base station side determines the user equipment as edge user equipment according to the received information, information about an applied interference coordination scheme and a coordinated cell for a cell where the user equipment locates from the device on base station side; and an executing step of performing blind detection for control information on an enhanced physical downlink control channel (EPDCCH) received from base stations of the cell where the user equipment locates and the coordinated cell.

According to another aspect of the disclosure, there is further provided a storage medium comprising machine-readable program codes that, when executed on an information processing apparatus, cause the information processing apparatus to execute the following steps: an edge user equipment identifying step of identifying, according to information about user equipment received from the user equipment, edge user equipment on an enhanced physical downlink control channel (EPDCCH); and an interference coordinating step of applying an interference coordination scheme to the EPDCCH of the edge user equipment.

According to another aspect of the disclosure, there is further provided a storage medium comprising machine-readable program codes that, when executed on an information processing apparatus, causes the information processing apparatus to execute the following steps: a sending step of sending information about user equipment to the device on base station side; a receiving step of receiving, if the device on base station side determines the user equipment as edge user equipment according to the received information, information about an applied interference coordination scheme and a coordinated cell for a cell where the user equipment locates from the device on base station side; and an executing step of performing blind detection for control information on an enhanced physical downlink control channel (EPDCCH) received from base stations of the cell where the user equipment locates and the coordinated cell.

According to another aspect of the disclosure, there is further provided a program product comprising machine-executable instructions that, when executed on an information processing apparatus, cause the information processing apparatus to execute the following steps: an edge user equipment identifying step of identifying, according to information about user equipment received from the user equipment, edge user equipment on an enhanced physical downlink control channel (EPDCCH); and an interference coordinating step of applying an interference coordination scheme to the EPDCCH of the edge user equipment.

According to another aspect of the disclosure, there is further provided a program product comprising machine-executable instructions that, when executed on an information processing apparatus, cause the information processing apparatus to execute the following steps: a sending step of sending information about user equipment to the device on base station side; a receiving step of receiving, if the device on base station side determines the user equipment as edge user equipment according to the received information, information about an applied interference coordination scheme and a coordinated cell for a cell where the user equipment locates from the device on base station side; and an executing step of performing blind detection for control information on an enhanced physical downlink control channel (EPDCCH) received from base stations of the cell where the user equipment locates and the coordinated cell.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE INVENTION

Figure 1:
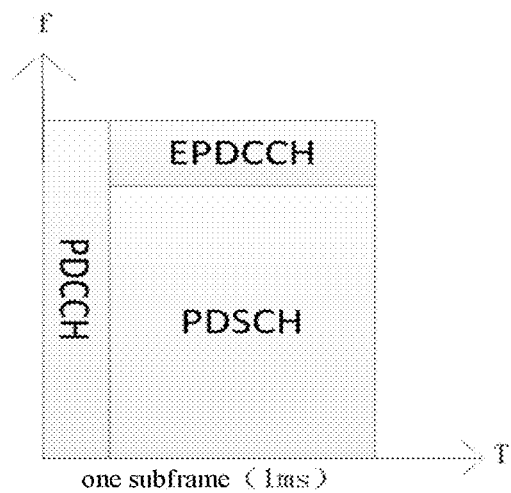
FIG. 1 is a schematic view illustrating an enhanced physical downlink control channel (EPDCCH)

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Figure 2:
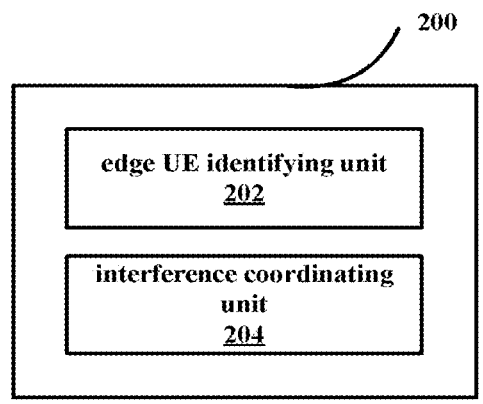
FIG. 2 is a block diagram illustrating an example of function configuration of a device on base station side in a wireless communication system according to an embodiment of the disclosure.

Hereinafter, the embodiments of the disclosure will be described with reference to FIG. 2 to FIG. 17. Firstly, an example of function configuration of a device on base station side in a wireless communication system according to an embodiment of the disclosure will be described with reference to FIG. 2. FIG. 2 is a block diagram illustrating an example of function configuration of a device on base station side in a wireless communication system according to an embodiment of the disclosure.

As shown in FIG. 2, a device 200 on base station side may include an edge user equipment identifying unit 202 and an interference coordinating unit 204.

The edge user equipment identifying unit 202 may be configured to identify, according to information about user equipment received from the user equipment, edge user equipment on an EPDCCH.

Specifically, the edge user equipment identifying unit 202 may define and identify the edge user equipment by adopting any well-known method in the art, such as an identification method using channel quality indication (CQI) feedback, an identification method using reference signal receiving power (RSRP), and so on. Hereinafter, descriptions will be made by taking the identification method using RSRP as an example.

In the identification method using RSRP, a threshold $\alpha$ is set in advance, user equipment will be identified as the edge user equipment when RSRP ($RSRP_{serving\_cell}$) of a serving cell of the user equipment and RSRP ($RSRP_{adjacent\_cell}$) of a certain adjacent cell satisfy expression (1):

$$RSRP_{serving\_cell} - RSRP_{adjacent\_cell} < \alpha \qquad (1)$$

where the threshold $\alpha$ may be set in advance according to factors such as the anti-interference capability of the communication system, design requirements and so on.

Figure 3:
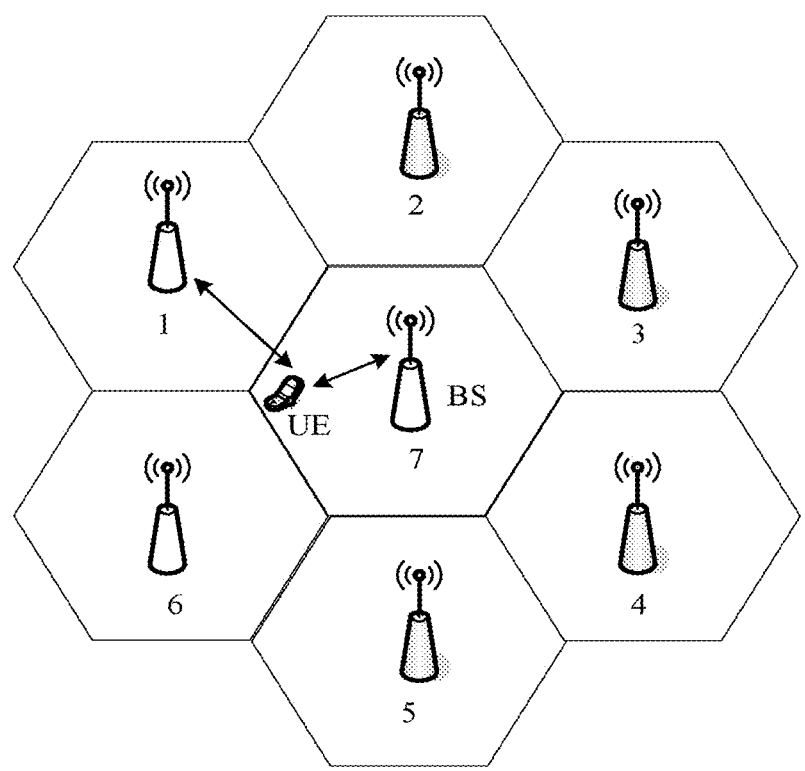
FIG. 3 is a schematic view illustrating identification of edge user equipment.

For example, if certain user equipment satisfies the expression (1), the user equipment will be regarded as the edge user equipment on the EPDCCH, and meanwhile one or more cells producing primary interference on the edge user equipment can be determined, and these cells constitute a coordinated cell set. For example, as shown in FIG. 3, user equipment for which a cell 7 and its adjacent cells 1 and 6 satisfy the expression (1) is present in the cell 7, so the user equipment will be regarded as the edge user equipment, and meanwhile the adjacent cells 1 and 6 will be regarded as primary interfering cells, and these cells shall perform coordination with one another.

It should be understood that although the identification of the edge user equipment has been described above by taking the method using RSRP as an example, the disclosure is not limited thereto but can also identify the edge user equipment using any well-known method in the art.

In addition, alternatively, the edge user equipment identifying unit 202 may be further configured to determine the edge user equipment according to a Quality-of-Service (QoS) requirement of the user equipment. As should be understood, the edge user equipment in this case may also be called QoS edge user equipment, and user equipment other than the QoS edge user equipment may be called QoS central user equipment.

Specifically, if a target channel quality corresponding to a QoS requirement of user equipment is $CQI_L$, a channel quality of a single cell of the user equipment is CQI and a difference value between $CQI_L$ and CQI is greater than a predetermined threshold, the user equipment will be determined as the QoS edge user equipment; otherwise the user equipment will be determined as the QoS central user equipment. It should be understood that the above predetermined threshold is set according to the applied wireless communication system and the actual requirements, so as to enable the user equipment to achieve a channel quality satisfying its QoS requirement by increasing the ECCE aggregation level.

It should be understood that both determining the edge user equipment in a conventional manner and determining the edge user equipment according to the QoS requirement are applicable to the technical solution of the disclosure.

The interference coordinating unit 204 may be configured to apply an interference coordination scheme to the EPDCCH of the identified edge user equipment.

Preferably, the interference coordination scheme herein may include at least one of a Coordinated Multipoint (CoMP) transmission scheme and an Almost Blank Subframe (ABS) scheme. In addition, the CoMP scheme may preferably include at least one of Joint Transmission (JT), Dynamic Cell Selection (DCS, also referred to as DPS), Dynamic Cell Blanking (DPB), Coordinated Scheduling/Coordinated Beamforming (CS/CB) and Semi-Static Cell Selection/Blanking (SSPS/B), and JT and DCS may also be collectively called Joint Processing (IP).

Hereinafter, detailed embodiments of the invention will be described by taking the JT scheme and the CS/CB scheme in the CoMP scheme as examples. However, it should be understood that the schemes are only exemplary but not limitation, and that the invention can also be applied to other CoMP schemes (such as the DPS scheme, the DPB scheme, the SSPS/B scheme and so on) and even other interference coordination schemes (e.g. the ABS scheme).

Preferably, the interference coordinating unit 204 may be further configured to select and apply the CoMP transmission scheme according to a channel quality of a single cell where the edge user equipment locates and a predetermined channel quality determined based on a QoS requirement.

Specifically, assuming that the QoS requirement of the user equipment is divided into K levels according to actual requirements, an actual QoS level is marked as L and an appropriate $CQI_L$ is set for the QoS level L. When the user equipment is identified as the edge user equipment, an optimal CoMP transmission scheme is selected according to a difference value between the $CQI_L$ and the CQI of the single cell of the user equipment. Specifically, the JT scheme is selected when the difference value is relatively great, and the CS/CB scheme is selected when the difference value is slightly small. An exemplary judgment manner may be shown as follows (with an assumption that K=3):

TABLE 1

Mapping Relationship Between QoS Level and $CQI_L$

| QoS Level | 1 | 2 | 3 |
|---|---|---|---|
| $CQI_L$ | 3 | 7 | 11 |

$$CQI_L - CQI = \begin{cases} \geq 5, \text{ 3-cell } JT \text{ is adopted} \\ 3 \text{ or } 4, \text{ 2-cell } JT \text{ or 3-cell } CS/CB \text{ is adopted} \\ 1 \text{ or } 2, \text{ 2-cell } CS/CB \text{ is adopted} \\ \text{others, no interference coordination scheme is adopted} \end{cases} \quad (2)$$

In addition, preferably, the interference coordinating unit 204 may be further configured to select an optimal CoMP scheme according to a backhaul type. Specifically, for example, in the case of an ideal backhaul, the JT scheme or the DPS scheme may be selected to acquire a relatively great gain as far as possible; and in the case of a non-ideal backhaul, the CS/CB scheme or the SSPS/B scheme may be adopted, thereby performing interaction with use of less information and acquiring a gain.

As should be understood, the foregoing manner of selecting the optimal CoMP scheme by the interference coordinating unit 204 is only exemplary but not limitation, and a person skilled in the art would conceive of selecting the optimal CoMP scheme by combining the above two manners or adopting other manners than the above two manners.

It should be noted that although in the prior art the CoMP scheme has been applied widely to the edge user equipment on the PDSCH, the technique of applying the CoMP scheme to the edge user equipment on the EPDCCH according to the disclosure differs from the CoMP technique applied to the PDSCH and is more complicated. Specifically, in accordance with the technique of applying the CoMP scheme to the edge user equipment on the EPDCCH according to the disclosure, one resource block (RB) may be allocated to a plurality of user equipment, including user equipment in other cells, while in accordance with the CoMP technique applied to the PDSCH, one RB can be allocated to only one user equipment. Thus, without considering space division multiplexing, in accordance with the technique according to the disclosure, multi-user CoMP (MU-CoMP) can be realized, that is, user equipment in the present cell and coordinated cells can be simultaneously served.

Figure 4:
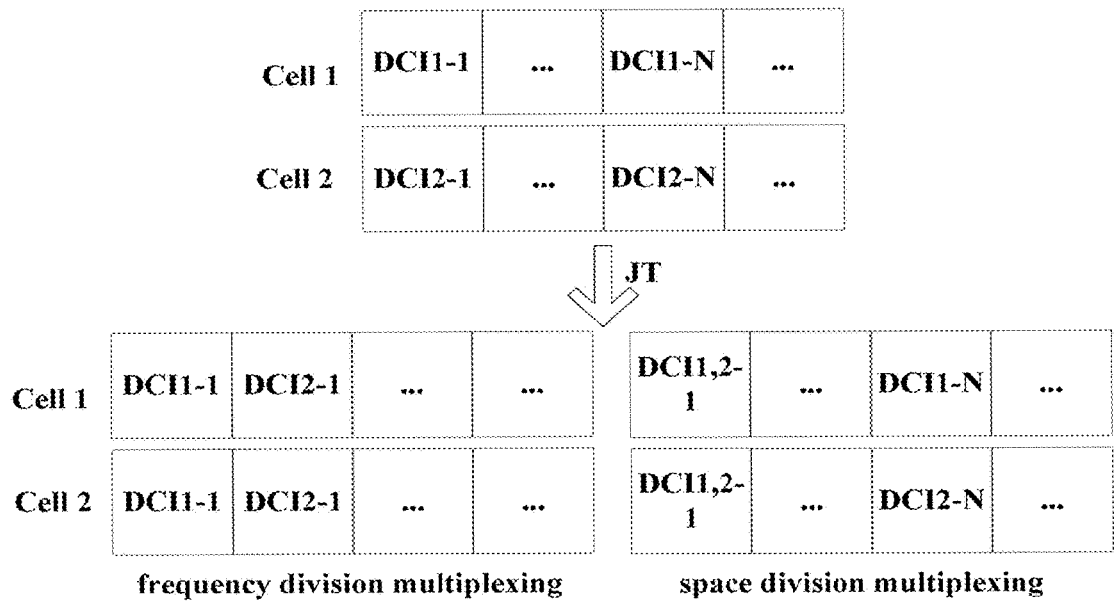
FIG. 4 is a schematic view illustrating application of a joint transmission (JT) scheme to edge user equipment.

FIG. 4 schematically illustrates the JT scheme applied to the edge user equipment on the EPDCCH. As shown in FIG. 4, DCI1-N and DCI2-N (where N is an integer greater than or equal to 1) refer to DC's of N-th user equipment in a cell 1 and a cell 2. When first user equipment in the cell 1 and the cell 2 (that is, UE1-1 and UE2-1) severely interfere with each other, the JT scheme is adopted for the two user equipment, and both of the two cells carry control information of UE1-1 and UE2-1, i.e. DCI1-1 and DCI2-1. Preferably, the following two JT manners may be adopted: frequency division multiplexing (FDM)), according to which the control information of the two user equipment is mapped to different DCI resources of the same cell, and which will not change the original control information aggregation level of the user equipment and is relatively simple; and space division multiplexing (SDM), according to which the control information of the two user equipment is mapped to the same DCI resource using multi-antenna characteristic, and which can save DCI space. The JT technique is a well-known technique in the art, and will not be described repeatedly herein.

Figure 5:
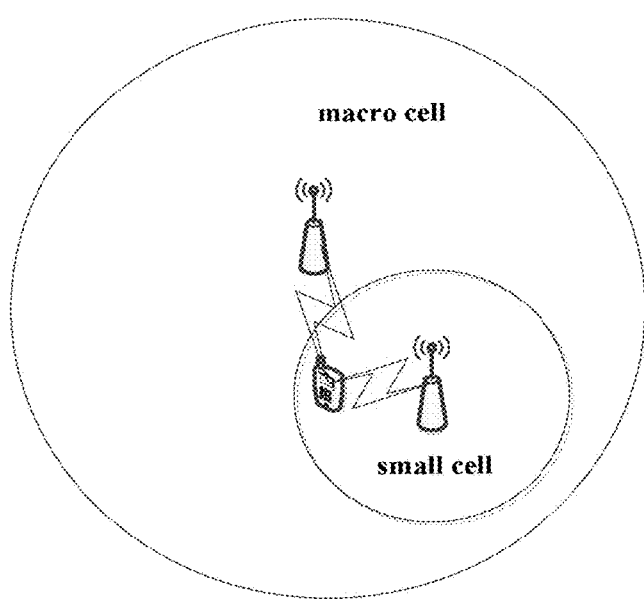
FIG. 5 is a schematic view illustrating a heterogeneous network.

In addition, in the heterogeneous network, the CoMP technique applied to the EPDCCH also differs somewhat from the CoMP technique applied to the PDSCH. Specifically, for example, the JT technique applied to the PDSCH refers to that two base stations send the same information at the same time frequency unit, and it differentiates signals using space. In the heterogeneous network, however, the JT technique applied to the EPDCCH can send the same information at different time frequency units, thus improving the performance of the user equipment to some extent. For example, as shown in FIG. 5, when coordination is performed between a macro cell and a small cell, base stations in the two cells send the same DCI information to the user equipment at different frequency bands, and the user equipment will perform blind detection on the two frequency bands, thus improving the performance of the user equipment to some extent.

As can be seen from the foregoing descriptions made with reference to FIGS. 2-5, according to the embodiment of the disclosure, it is possible to efficiently support accurate transmission of the control channel signaling and improve the performance of the edge user equipment, by applying the interference coordination scheme to the EPDCCH.

Figure 6:
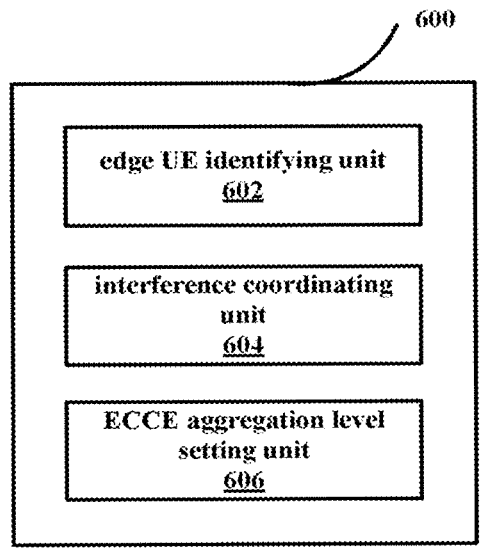
FIG. 6 is a block diagram illustrating an example of function configuration of a device on base station side in a wireless communication system according to another embodiment of the disclosure.

Next, an example of function configuration of a device on base station side in a wireless communication system according to another embodiment of the disclosure will be described with reference to FIG. 6. FIG. 6 is a block diagram illustrating an example of function configuration of a device on base station side in a wireless communication system according to another embodiment of the disclosure.

As shown in FIG. 6, a device 600 on base station side may include an edge user equipment identifying unit 602, an interference coordinating unit 604, and an ECCE aggregation level setting unit 606. Function configurations of the edge user equipment identifying unit 602 and the interference coordinating unit 604 as shown in FIG. 6 are the same as function configurations of the edge user equipment identifying unit 202 and the interference coordinating unit 204 as shown in FIG. 2 respectively, and will not be described in detail repeatedly herein. Hereinafter, only an example of function configuration of the ECCE aggregation level setting unit 606 will be described in detail.

The ECCE aggregation level setting unit 606 may be configured to set an ECCE aggregation level for the edge user equipment according to the applied interference coordination scheme.

As well-known in the art, a high-level ECCE aggregation level is adapted to a poor channel condition due to its advantages of an excellent performance of demodulation of EPDCCH and a small signal to interference-plus-noise ratio (SINR) of a demodulation threshold; and a contrary case applies to a low-level ECCE aggregation level. A standard ECCE aggregation level set defined in 3GPP standard is as shown in TABLE 2 below (for details, please refer to 3GPP TS 36.123, "Physical layer procedures").

TABLE 2

ECCE Aggregation Level Defined in Standard

| ECCE Aggregation Level | Case 1 | {2, 4, 8, 16, 32} |
|---|---|---|
| | Case 2/3 | {1, 2, 4, 8, 16} |

The case 1, the case 2 and the case 3 are three cases as divided for the EPDCCH in 3GPP TS 36.123 respectively.

As should be understood, since the interference coordination scheme such as the CoMP scheme is applied to the EPDCCH and different interference coordination schemes (such as the JT scheme or the CS/CB scheme) can improve the channel quality of the EPDCCH to different extents, an ECCE aggregation level lower than that when no interference coordination scheme is applied can be used while ensuring the performance of the edge user equipment on the EPDCCH.

Preferably, the ECCE aggregation level setting unit 606 may be further configured to set an ECCE aggregation level candidate set, which is smaller than that when no interference coordination scheme is applied on the EPDCCH, for the edge user equipment. An exemplary manner of setting the ECCE aggregation level candidate set is as shown in TABLE 3 below.

TABLE 3

ECCE Aggregation Level Candidate Set
Which is Set According to CoMP Scheme

| CoMP Scheme | | JT | CS/CB |
|---|---|---|---|
| ECCE Aggregation Level | Case 1 | {2, 4, 8} | {2, 4, 8, 16} |
| | Case 2/3 | {1, 2, 4} | {1, 2, 4, 8} |

Alternatively, the ECCE aggregation level setting unit 606 may be further configured to set an ECCE aggregation level reduction for the edge user equipment according to the applied interference coordination scheme, the ECCE aggregation level reduction indicating a reduction in level as compared with the ECCE aggregation level being set when no interference coordination scheme is applied on the EPDCCH. An exemplary manner of setting the ECCE aggregation level reduction is as shown in TABLE 4 below.

TABLE 4

ECCE Aggregation Level Reduction Which
is Set According to CoMP Scheme

| | JT | | CS/CB | |
|---|---|---|---|---|
| CoMP Scheme | 3-Cell Coordination | 2-Cell Coordination | 3-Cell Coordination | 2-Cell Coordination |
| ECCE Aggregation Level | M-3 | M-2 | M-2 | M-1 |

M represents an ECCE aggregation level corresponding to the user equipment when no CoMP scheme is applied to the EPDCCH.

In addition, preferably, the ECCE aggregation level setting unit 606 may be further configured to determine, according to improvement in a channel quality of the EPDCCH when applying the interference coordination scheme on the EPDCCH as compared with that when no interference coordination scheme is applied, a degree of decrease of the ECCE aggregation level candidate set or the ECCE aggregation level reduction.

As can be seen from TABLE 3 and TABLE 4, the performance of the EPDCCH can be improved greatly when the JT scheme is adopted, while the performance of the EPDCCH can be improved slightly when the CS/CB scheme is adopted, so when the JT scheme is adopted, a smaller ECCE aggregation level candidate set or a greater ECCE aggregation level reduction as compared with that when the CS/CB scheme is adopted may be set, thereby making it possible to significantly reduce the number of times of blind detection performed by the user equipment, thus facilitating the improvement of the performance of the system.

Further, the ECCE aggregation level setting unit 606 may set an ECCE aggregation level of the edge user equipment according to CQI of a single cell of the user equipment and the set ECCE aggregation level candidate set. The basic principle herein is to divide the user equipment into different levels according to the CQI of the single cell, and to set the same ECCE aggregation level for user equipment at the same level. Taking the adoption of the CS/CB scheme as an example, TABLE 5 below shows an exemplary manner of setting the ECCE aggregation level according to the CQI, in a case where for example the ECCE aggregation level candidate set is as shown in TABLE 3.

TABLE 5

Selecting ECCE Aggregation Level According to CQI

| CQI Value | User Level/Level of Aggregation | ECCE Aggregation Level | |
|---|---|---|---|
| (0-15) | Level (1-4) | Case 1 | Case 2/3 |
| 0-5 | 4 | 16 | 8 |
| 6-9 | 3 | 8 | 4 |
| 10-12 | 2 | 4 | 2 |
| 13-15 | 1 | 2 | 1 |

In addition, preferably, the ECCE aggregation level setting unit 606 may be further configured to adjust the ECCE aggregation level for the edge user equipment according to a QoS requirement thereof. Specifically, the ECCE aggregation level setting unit 606 may increase/maintain/decrease, based on the ECCE aggregation level set after the application of the interference coordination scheme, the ECCE aggregation level of the edge user equipment in combination with the QoS requirement thereof.

In addition, preferably, the ECCE aggregation level setting unit 606 may be further configured to increase, for central user equipment other than the edge user equipment, the ECCE aggregation level of the central user equipment according to a QoS requirement thereof. For example, the ECCE aggregation level may be properly increased by one or two levels to satisfy the QoS requirement of the central user equipment, according to relationship of a difference value between a target channel quality $CQI_L$ corresponding to the QoS requirement of the central user equipment and the channel quality CQI of the single cell with respect to a predetermined threshold.

As can be seen from the foregoing descriptions of the embodiments, by properly setting the ECCE aggregation levels of the edge user equipment and the central user equipment in combination with the QoS requirements of the user equipment while applying the interference coordination scheme such as CoMP to the EPDCCH of the edge user equipment, it is possible to improve the channel quality of the EPDCCH of the edge user equipment and improve the response speed of the system while satisfying the QoS requirement of the user equipment.

In addition, the user equipment may be notified, through high layer signaling, of the ECCE aggregation level candidate set or the ECCE aggregation level reduction or the specific ECCE aggregation level set in the above manner such that the user equipment can perform blind detection according to the received ECCE aggregation level, so it is possible to reduce the number of times of blind detection and/or improve the service quality, thereby optimizing the performance of the system.

Figure 7:
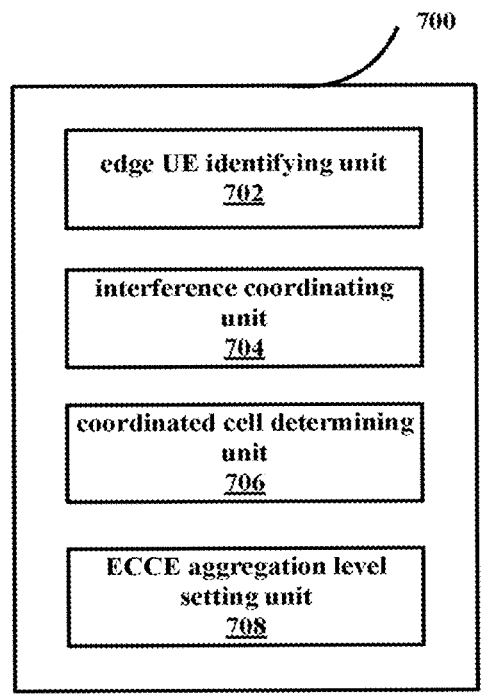
FIG. 7 is a block diagram illustrating an example of function configuration of a device on base station side in a wireless communication system according to another embodiment of the disclosure.

Next, an example of function configuration of a device on base station side in a wireless communication system according to another embodiment of the disclosure will be described with reference to FIG. 7. FIG. 7 is a block diagram illustrating an example of function configuration of a device on base station side in a wireless communication system according to another embodiment of the disclosure.

As shown in FIG. 7, a device 700 on base station side may include an edge user equipment identifying unit 702, an interference coordinating unit 704, a coordinated cell determining unit 706 and an ECCE aggregation level setting unit 708. Function configurations of the edge user equipment identifying unit 702 and the interference coordinating unit 704 are the same as function configurations of the edge user equipment identifying unit 602 and the interference coordinating unit 604 as shown in FIG. 6 respectively, and will not be described in detail repeatedly herein. Hereinafter, only examples of function configurations of the coordinated cell determining unit 706 and the ECCE aggregation level setting unit 708 will be described in detail.

The coordinated cell determining unit 706 may be configured to determine a coordinated cell according to a channel quality of the EPDCCH of the edge user equipment when each cell coordinates with a cell where the edge user equipment locates.

Specifically, the coordinated cell determining unit 706 may first roughly select a candidate coordinated cell set of a cell where the edge user equipment locates, according to strong interference or a geographical position, as described above with reference to Expression (1), and thereafter may further select an actual coordinated cell according to a channel quality of the EPDCCH of the edge user equipment when the cell where edge user equipment locates coordinates with respective cells in the candidate coordinated cell set. For example, a cell with the best channel quality which is obtained through coordination may be selected as a coordinated cell, or one or more cells with channel qualities greater than or equal to a predetermined channel quality threshold which are obtained through coordination may also be selected as coordinated cells.

Preferably, in addition to the function configuration of the ECCE aggregation level setting unit 606 described above with reference to FIG. 6, the ECCE aggregation level setting unit 708 may be further configured to set the ECCE aggregation level for the edge user equipment according to the determined coordinated cells. For example, the ECCE aggregation level reduction may be determined according to whether 3-cell coordination or 2-cell coordination is adopted when the CoMP scheme is applied, as described above with reference to TABLE 4.

Figure 8:
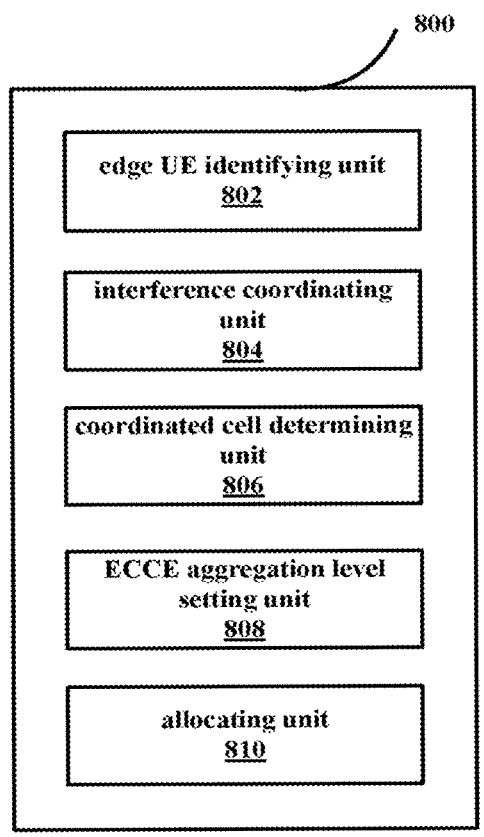
FIG. 8 is a block diagram illustrating an example of function configuration of a device on base station side in a wireless communication system according to another embodiment of the disclosure.

Hereinafter, an example of function configuration of a device on base station side in a wireless communication system according to another embodiment of the disclosure will be described with reference to FIG. 8. FIG. 8 is a block diagram illustrating an example of function configuration of a device on base station side in a wireless communication system according to another embodiment of the disclosure.

As shown in FIG. 8, a device 800 on base station side may include an edge user equipment identifying unit 802, an interference coordinating unit 804, a coordinated cell determining unit 806, an ECCE aggregation level setting unit 808, and an allocating unit 810. Function configurations of the edge user equipment identifying unit 802, the interference coordinating unit 804, the coordinated cell determining unit 806 and the ECCE aggregation level setting unit 808 are the same as function configurations of the edge user equipment identifying unit 702, the interference coordinating unit 704, the coordinated cell determining unit 706 and the ECCE aggregation level setting unit 708 as shown in FIG. 7 respectively, and will not be described in detail repeatedly herein. Hereinafter, only an example of function configuration of the allocating unit 810 will be described in detail.

The allocating unit 810 may be configured to allocate EPDCCH space saved according to the ECCE aggregation level set for the edge user equipment to other user equipment in the cell where the edge user equipment locates or user equipment in other cells.

Specifically, as can be seen from the foregoing descriptions of the embodiments, since the interference coordination scheme such as CoMP is applied to the EPDCCH of the edge user equipment, the ECCE aggregation level on the EPDCCH of the edge user equipment can be decreased, thus saving the space of the EPDCCH and increasing the capacity of the channel. In addition, in accordance with the characteristic of applying the CoMP scheme to the EPDCCH described above, the saved space can be allocated not only to other user equipment in the cell where the edge user equipment locates but also to user equipment in other cells, thereby making it possible to improve service qualities for these user equipment such that the overall performance of the system is improved.

Figure 9:
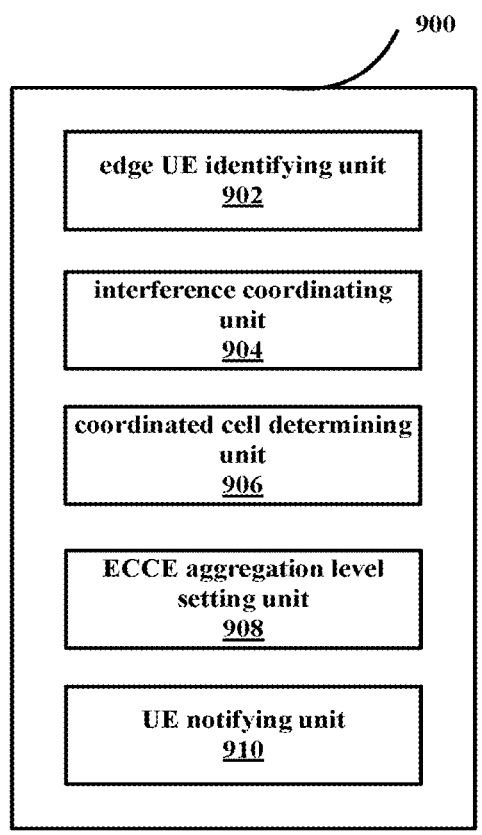
FIG. 9 is a block diagram illustrating an example of function configuration of a device on base station side in a wireless communication system according to another embodiment of the disclosure.

Hereinafter, an example of function configuration of a device on base station side in a wireless communication system according to another embodiment of the disclosure will be described with reference to FIG. 9. FIG. 9 is a block diagram illustrating an example of function configuration of a device on base station side in a wireless communication system according to another embodiment of the disclosure.

As shown in FIG. 9, a device 900 on base station side may include an edge user equipment identifying unit 902, an interference coordinating unit 904, a coordinated cell determining unit 906, an ECCE aggregation level setting unit 908, and a user equipment notifying unit 910. Function configurations of the edge user equipment identifying unit 902, the interference coordinating unit 904, the coordinated cell determining unit 906 and the ECCE aggregation level setting unit 908 are the same as function configurations of the edge user equipment identifying unit 702, the interference coordinating unit 704, the coordinated cell determining unit 706 and the ECCE aggregation level setting unit 708 as shown in FIG. 7 respectively, and will not be described in detail repeatedly herein. Hereinafter, only an example of function configuration of the user equipment notifying unit 910 will be described in detail.

The user equipment notifying unit 910 may be configured to notify the user equipment of the applied coordination scheme, information about the coordinated cell and/or the set ECCE aggregation level.

Specifically, the user equipment notifying unit 910 may notify the user equipment of the above information through high layer signaling, such that the user equipment may perform blind detection according to the received information. It could be understood that, for example, since the ECCE aggregation level on the EPDCCH of the edge user equipment is decreased, the user equipment may start blind detection from the decreased ECCE aggregation level, thus making it possible to reduce the number of times of blind detection to thereby improve the response speed of the system.

It should note that although the embodiments of the disclosure have been described above by taking the COMP scheme as an example, it should be understood that the invention also applies to other interference coordination schemes. For example, in the case of the ABS scheme, time domain coordination is realized by introducing the ABS scheme in a time domain so as to reduce interference. The ABS includes only some essential signals, such as a primary synchronization signal/secondary synchronization signal (PSS/SSS), a physical broadcast channel (PBCH), a common reference signal (CRS), Paging, system information block 1 (SIB1) (for compatibility with UE of R8/R9) and so on, and the power thereof is relatively low, so by configuring the ABS in an interfering cell, an interfered cell may provide service for user equipment which is originally subjected to strong interference (subjected to weak interference at this time), thereby realizing inter-cell interference coordination.

As an exemplary scenario, for example, for a main interference scenario in an heterogeneous network (i.e. interference between a macro base station and a small base station), to avoid producing strong interference on user equipment accessing to the small base station, the macro base station may configure corresponding subframes as ABSs, and the small base station provides service for the user equipment on the ABSs, thereby making it possible to improve the performance of the user equipment. In addition, by setting the ECCE aggregation level of the user equipment according to the above method, it is possible to reduce the number of times of blind detection to improve the response speed of the system. For detailed procedure, please refer to the foregoing descriptions in regard to the CoMP scheme, and no details be described repeatedly herein.

It should be noted that although the examples of function configurations of device on base station side in a wireless communication system according to the embodiments of the disclosure have been described above with reference to FIGS. 2 to 9, the examples are only exemplary but not limitations, and a person skilled in the art could conceive of combining the functional modules described in the embodiments and/or omitting and/or adding one or more functional modules according to actual requirements, and such modified examples should be regarded as falling within the scope of the disclosure.

In addition, it should also be noted that the device on base station side described above may be a device included in the base station and may also be an independent device separated from the base station, which will not be limited by the disclosure.

Figure 10:
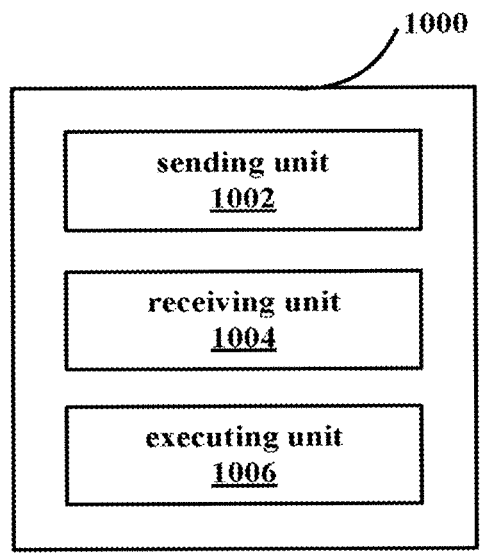
FIG. 10 is a block diagram illustrating an example of function configuration of a device on user equipment side in a wireless communication system according to an embodiment of the disclosure.

Next, an example of function configuration of a device on user equipment side in a wireless communication system according to an embodiment of the disclosure will be described with reference to FIG. 10. FIG. 10 is a block diagram illustrating an example of function configuration of a device on user equipment side in a wireless communication system according to an embodiment of the disclosure.

As shown in FIG. 10, a device 1000 on user equipment side may include a sending unit 1002, a receiving unit 1004 and an executing unit 1006. Hereinafter, examples of function configurations of the respective units will be described in detail.

The sending unit 1002 may be configured to send information about the user equipment to the device on base station side. For example, the information about the user equipment which is sent to the device on base station side may include but is not limited to geographical position information, RSRP information, channel quality information and/or Quality-of-Service requirement information and the like of the user equipment, for the device on base station side to determine whether the user equipment is the edge user equipment and to determine the coordinated cell(s) for the cell where the user equipment locates, an interference coordination scheme adapted to the user equipment and/or a proper ECCE aggregation level and the like.

The receiving unit 1004 may be configured to receive, if the device on base station side determines the user equipment as the edge user equipment according to the received information, information about the applied interference coordination scheme and the coordinated cell(s) for the cell where the user equipment locates from the device on base station side.

The executing unit 1006 may be configured to perform blind detection for control information on the EPDCCH received from base stations of the cell where the user equipment locates and the coordinated cell(s).

Specifically, as stated above, the interference coordination scheme is applied to the EPDCCH of the edge user equipment to improve the performance of the edge user equipment, so if the user equipment is the edge user equipment, the user equipment not only receives control information (such as DCI) from the base station of the cell where it locates but also receives control information from base station(s) in the coordinated cell(s) thereof, and the executing unit 1006 may be configured to perform blind detection for the received control information.

Preferably, the executing unit 1006 may be further configured to start in priority blind detection from an ECCE aggregation level lower than that when the interference coordination scheme is not applied on the EPDCCH. In this way, the number of times of blind detection can be reduced, thereby improving the response speed of the system.

Figure 11:
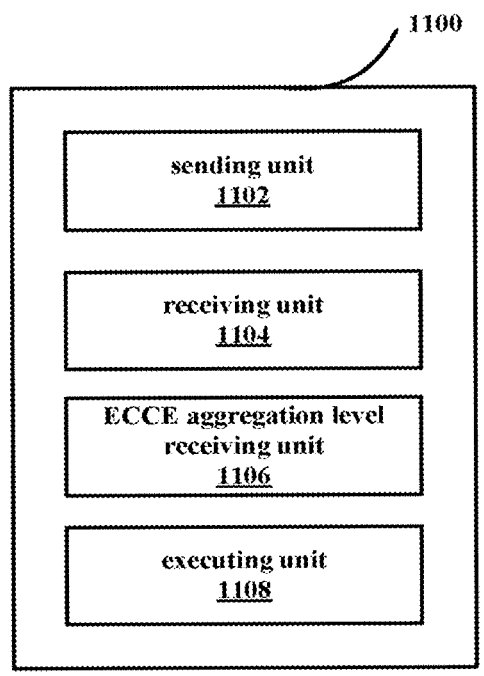
FIG. 11 is a block diagram illustrating an example of function configuration of a device on user equipment side in a wireless communication system according to another embodiment of the disclosure.

Next, an example of function configuration of a device on user equipment side in a wireless communication system according to another embodiment of the disclosure will be described with reference to FIG. 11. FIG. 11 is a block diagram illustrating an example of function configuration of a device on user equipment side in a wireless communication system according to another embodiment of the disclosure.

As shown in FIG. 11, a device 1100 on user equipment side may include a sending unit 1102, a receiving unit 1104, an ECCE aggregation level receiving unit 1106 and an executing unit 1108. Function configurations of the sending unit 1102 and the receiving unit 1104 are the same as function configurations of the sending unit 1002 and the receiving unit 1004 as shown in FIG. 10 respectively, and will not be described in detail repeatedly herein. Hereinafter, only examples of function configurations of the ECCE aggregation level receiving unit 1106 and the executing unit 1108 will be described in detail.

The ECCE aggregation level receiving unit 1106 may be configured to receive from the device on base station side an ECCE aggregation level candidate set which is smaller than that when no interference coordination scheme is applied on the EPDCCH or an ECCE aggregation level reduction for the user equipment, the ECCE aggregation level reduction indicating a reduction in level as compared with the ECCE aggregation level being set when no interference coordination scheme is applied on the EPDCCH.

It should be noted that when the user equipment gets access to the base station, the device on base station side may send the set ECCE aggregation level candidate set or ECCE aggregation level reduction to the user equipment through high layer signaling by means of system broadcast or in other manners. The information about the applied CoMP scheme and the coordinated cell(s) is sent to the user equipment only when the user equipment sends a service request to the base station.

Preferably, the executing unit 1108 may be configured to perform blind detection according to the ECCE aggregation level candidate set or the ECCE aggregation level reduction which is received by the ECCE aggregation level receiving unit 1106. In this way, the number of times of blind detection can be reduced, thereby improving the response speed of the system.

Figure 12:
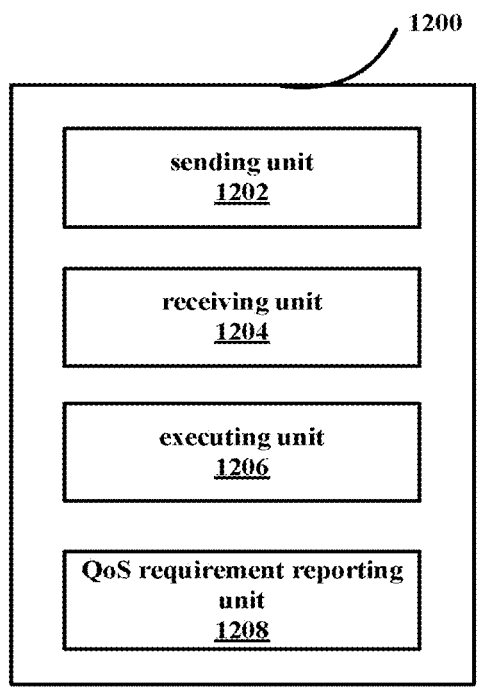
FIG. 12 is a block diagram illustrating an example of function configuration of a device on user equipment side in a wireless communication system according to another embodiment of the disclosure.

FIG. 12 is a block diagram illustrating an example of function configuration of a device on user equipment side in a wireless communication system according to another embodiment of the disclosure.

As shown in FIG. 12, a device 1200 on user equipment side may include a sending unit 1202, a receiving unit 1204, an executing unit 1206, and a Quality-of-Service (QoS) requirement reporting unit 1208. Function configurations of the sending unit 1202, the receiving unit 1204 and the executing unit 1206 are the same as function configurations of the sending unit 1002, the receiving unit 1004 and the executing unit 1006 as shown in FIG. 10 respectively, and will not be described in detail repeatedly herein. Hereinafter, only an example of function configuration of the QoS requirement reporting unit 1208 will be described in detail.

The Quality-of-Service requirement reporting unit 1208 may be configured to report a Quality-of-Service requirement of the user equipment to the device on base station side to be used for determining the applied interference coordination scheme and/or the ECCE aggregation level for the user equipment.

Specifically, as stated above, the device on base station side may determine the interference coordination scheme applied to the EPDCCH of the edge user equipment and the ECCE aggregation level on the EPDCCH according to the received Quality-of-Service requirement of the user equipment, thereby making it possible to satisfy the Quality-of-Service requirement of the user equipment by setting a proper ECCE aggregation level.

Similarly, it should be understood that although the examples of function configurations of the device on user equipment side in a wireless communication system according to the embodiments of the disclosure have been described above with reference to FIGS. 10 to 12, the examples are only exemplary but not limitation, and a person skilled in the art could conceive of combining the functional modules described in the embodiments and/or omitting and/or adding one or more functional modules according to actual requirements, and such modified examples should be regarded as falling within the scope of the disclosure.

In addition, it should also be noted that the device on user equipment side described above may be a device included in the user equipment and may also be an independent device separated from the user equipment, which will not be limited by the disclosure.

Figure 13:
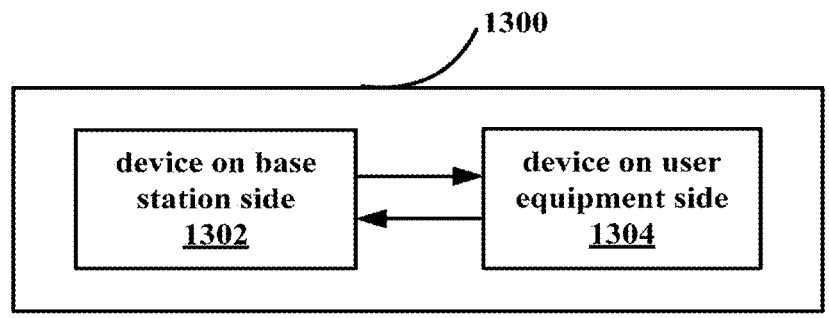
FIG. 13 is a block diagram illustrating exemplary configuration of a wireless communication system according to an embodiment of the disclosure.

FIG. 13 is a block diagram illustrating exemplary configuration of a wireless communication system according to an embodiment of the disclosure.

As shown in FIG. 13, a wireless communication system 1300 may include a device 1302 on base station side and a device 1304 on user equipment side. The device 1302 on base station side may be the device on base station side described above with reference to FIGS. 2 to 9, and the device 1304 on user equipment side may be the device on user equipment side described above with reference to FIGS. 10 to 12.

Specifically, in the wireless communication system, the device 1302 on base station side selects an optimal CoMP scheme for the edge user equipment on the EPDCCH according to information about user equipment from the device 1304 on user equipment side, sets an ECCE aggregation level candidate set or ECCE aggregation level reduction according to the selected CoMP scheme, and notifies the device 1304 on user equipment side through high layer signaling. The device 1304 on user equipment side may then perform blind detection for control information received from base stations in the cell where the user equipment locates and the coordinated cell(s) according to the received ECCE aggregation level candidate set or ECCE aggregation level reduction, making it possible to reduce the number of times of blind detection to thereby improve the response speed of the system.

Figure 14:
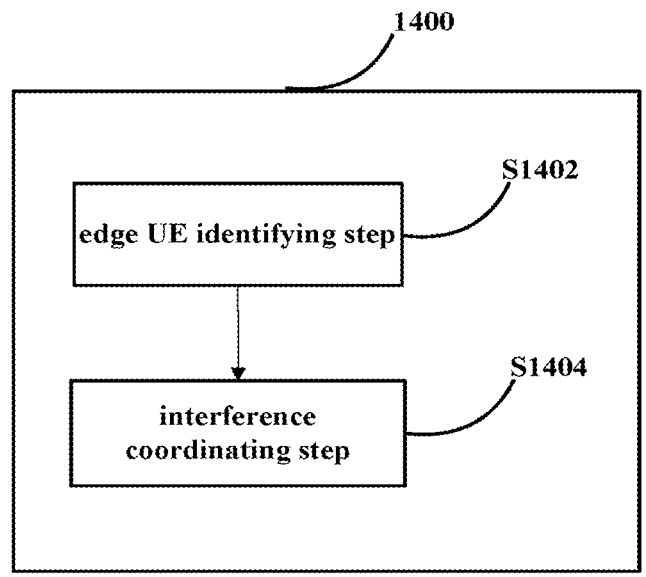
FIG. 14 is a flowchart illustrating a procedure example of a method for use in a wireless communication system according to an embodiment of the disclosure.

Hereinafter, a procedure example of a method for use in a wireless communication system according to an embodiment of the disclosure will be described with reference to FIG. 14. FIG. 14 is a flowchart illustrating a procedure example of a method for use in a wireless communication system according to an embodiment of the disclosure.

As shown in FIG. 14, a method 1400 may include an edge user equipment identifying step S1402 and an interference coordinating step S1404.

In the edge user equipment identifying step S1402, edge user equipment on the EPDCCH may be identified according to information about user equipment received from the user equipment.

Next, in the interference coordinating step S1404, an interference coordination scheme may be applied to the EPDCCH of the edge user equipment.

It should be noted that the method 1400 described herein is a method embodiment corresponding to the above device on base station side. Therefore, contents which are not described in detail in the method embodiment may be referred to the descriptions at corresponding positions of the above device embodiment, and will not be described repeatedly herein.

Figure 15:
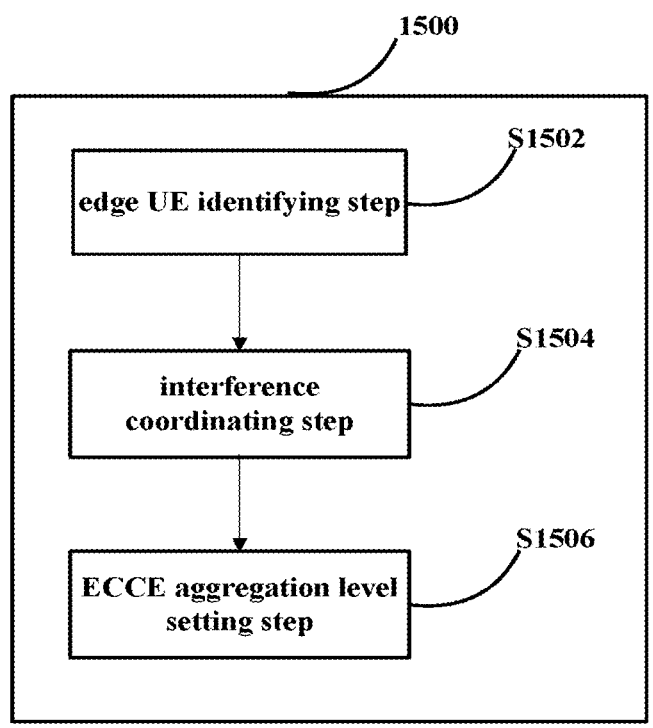
FIG. 15 is a flowchart illustrating a procedure example of a method for use in a wireless communication system according to another embodiment of the disclosure.

FIG. 15 is a flowchart illustrating a procedure example of a method for use in a wireless communication system according to another embodiment of the disclosure.

As shown in FIG. 15, a method 1500 may include an edge user equipment identifying step S1502, an interference coordinating step S1504 and an ECCE aggregation level setting step S1506. Processing in the edge user equipment identifying step S1502 and the interference coordinating step S1504 is the same as processing in the edge user equipment identifying step S1402 and the interference coordinating step S1404 as shown in FIG. 14, and will not be described in detail repeatedly herein. Hereinafter, only processing in the ECCE aggregation level setting step S1506 will be described.

In the ECCE aggregation level setting step S1506, an ECCE aggregation level for the edge user equipment may be set according to the applied interference coordination scheme.

It should be noted that the method 1500 described herein is a method embodiment corresponding to the above device on base station side. Therefore, contents which are not described in detail in the method embodiment may be referred to the descriptions at corresponding positions of the above device embodiment, and will not be described repeatedly herein.

Figure 16:
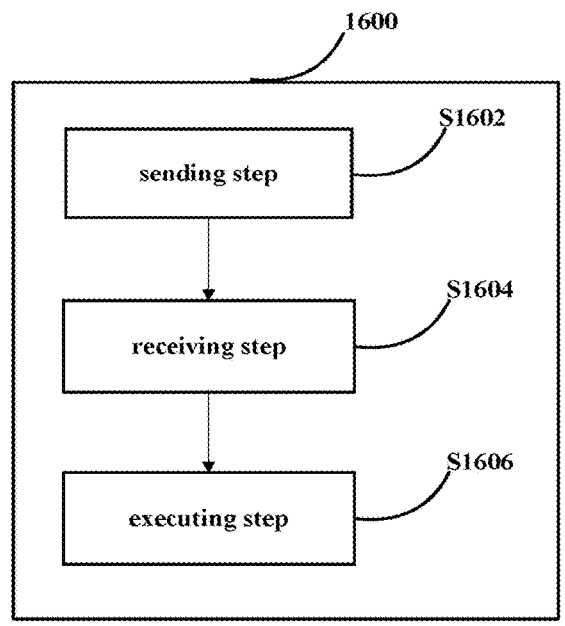
FIG. 16 is a flowchart illustrating a procedure example of a method for use in a wireless communication system according to an embodiment of the disclosure.

FIG. 16 is a flowchart illustrating a procedure example of a method for use in a wireless communication system according to an embodiment of the disclosure.

As shown in FIG. 16, a method 1600 may include a sending step S1602, a receiving step S1604 and an executing step S1606.

In the sending step S1602, information about the user equipment may be sent to the device on base station side.

Next, in the receiving step S1604, if the device on base station side determines the user equipment as the edge user equipment according to the received information, information about the applied interference coordination scheme and the coordinated cell(s) for the cell where the user equipment locates may be received from the device on base station side.

Then in the executing step S1606, blind detection may be performed for control information on the EPDCCH received from base stations of the cell where the user equipment locates and the coordinated cell(s).

Preferably, in the executing step S1606, blind detection may be started in priority from an ECCE aggregation level lower than that when no interference coordination scheme is applied on the EPDCCH.

It should be understood that the method 1600 as shown in FIG. 16 is a method embodiment corresponding to the above device on user equipment side. Therefore, contents which are not described in detail in the method embodiment may be referred to the descriptions at corresponding positions of the above device embodiment, and will not be described repeatedly herein.

In addition, an embodiment of the disclosure further provides a storage medium comprising machine-readable program codes that, when executed on an information processing apparatus, cause the information processing apparatus to execute the following steps: an edge user equipment identifying step of identifying, according to information about user equipment received from the user equipment, edge user equipment on an enhanced physical downlink control channel (EPDCCH); and an interference coordinating step of applying an interference coordination scheme to the EPDCCH of the edge user equipment.

In addition, an embodiment of the disclosure further provides a storage medium comprising machine-readable program codes that, when executed on an information processing apparatus, causes the information processing apparatus to execute the following steps: a sending step of sending information about user equipment to the device on base station side; a receiving step of receiving, if the device on base station side determines the user equipment as edge user equipment according to the received information, information about an applied interference coordination scheme and a coordinated cell for a cell where the user equipment locates from the device on base station side; and an executing step of performing blind detection for control information on an enhanced physical downlink control channel (EPDCCH) received from base stations of the cell where the user equipment locates and the coordinated cell.

In addition, an embodiment of the disclosure further provides a program product comprising machine-executable instructions that, when executed on an information processing apparatus, cause the information processing apparatus to execute the following steps: an edge user equipment identifying step of identifying, according to information about user equipment received from the user equipment, edge user equipment on an enhanced physical downlink control channel (EPDCCH); and an interference coordinating step of applying an interference coordination scheme to the EPDCCH of the edge user equipment.

In addition, an embodiment of the disclosure further provides a program product comprising machine-executable instructions that, when executed on an information processing apparatus, cause the information processing apparatus to execute the following steps: a sending step of sending information about user equipment to the device on base station side; a receiving step of receiving, if the device on base station side determines the user equipment as edge user equipment according to the received information, information about an applied interference coordination scheme and a coordinated cell for a cell where the user equipment locates from the device on base station side; and an executing step of performing blind detection for control information on an enhanced physical downlink control channel (EPDCCH) received from base stations of the cell where the user equipment locates and the coordinated cell.

It should be understood that the machine-executable instructions in the storage medium and the program product according to the embodiments of the disclosure may also be executed to carry out methods corresponding to the above device embodiments, so contents which are not described in detail herein may be referred to the foregoing descriptions at corresponding positions, and will not be described repeatedly herein.

Accordingly, a storage medium on which the above program product storing machine-readable instruction codes is carried is also included in the disclosure of the invention. The storage medium includes but is not limited to a floppy disk, an optical disk, a magneto-optical disk, a storage card, a memory rod and the like.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1700 illustrated in FIG. 17, which can perform various functions when various programs are installed thereon.

Figure 17:
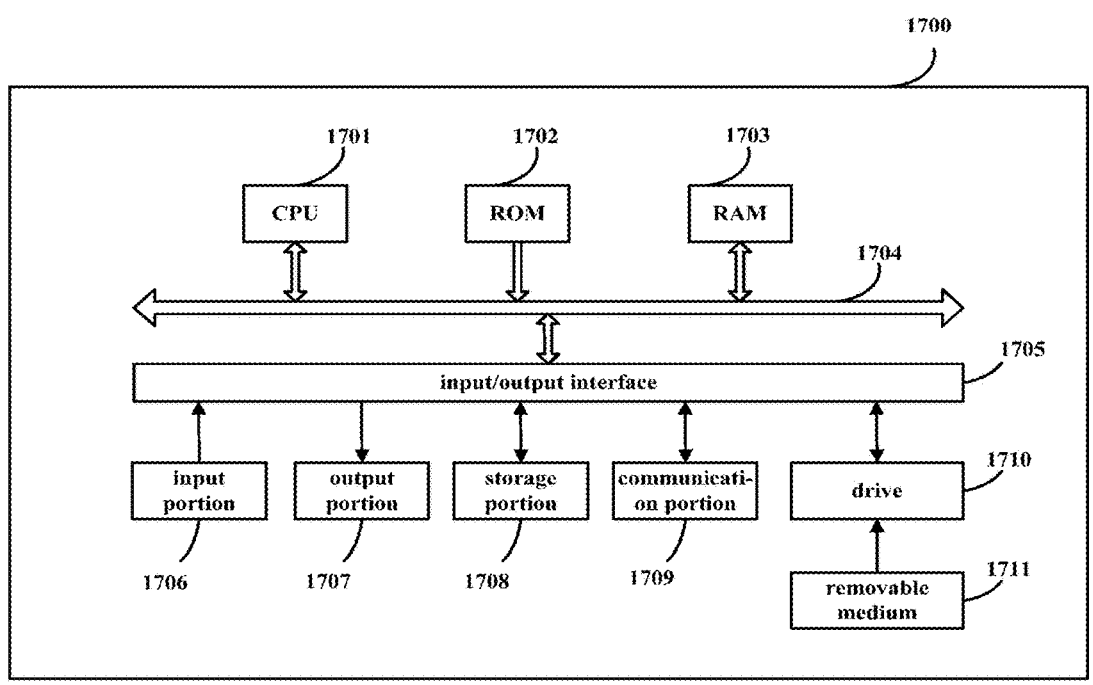
FIG. 17 is a block diagram illustrating an exemplary structure of a personal computer as an information processing apparatus that can be used in an embodiment of the disclosure.

In FIG. 17, a Central Processing Unit (CPU) 1701 performs various processes according to a program stored in a Read Only Memory (ROM) 1702 or loaded from a storage portion 1708 into a Random Access Memory (RAM) 1703 in which data required when the CPU 1701 performs the various processes is also stored as needed.

The CPU 1701, the ROM 1702 and the RAM 1703 are connected to each other via a bus 1704 to which an input/output interface 1705 is also connected.

The following components are connected to the input/output interface 1705: an input portion 1706 including a keyboard, a mouse, etc.; an output portion 1707 including a display, e.g., a Cathode Ray Tube (CRT), a Liquid Crystal Display (LCD), etc., a speaker, etc.; a storage portion 1708 including a hard disk, etc.; and a communication portion 1709 including a network interface card, e.g., an LAN card, a modem, etc. The communication portion 1709 performs a communication process over a network, e.g., the Internet.

A drive 1710 is also connected to the input/output interface 1705 as needed. A removable medium 1711, e.g., a magnetic disk, an optical disk, an magneto optical disk, a semiconductor memory, etc., can be installed on the drive 1710 as needed so that a computer program fetched therefrom can be installed into the storage portion 1708 as needed.

In the case that the foregoing series of processes are performed in software, a program constituting the software is installed from a network, e.g., the Internet, etc., or a storage medium, e.g., the removable medium 1711, etc.

Those skilled in the art shall appreciate that such a storage medium will not be limited to the removable medium 1711 illustrated in FIG. 17 in which the program is stored and which is distributed separately from the apparatus to provide a user with the program. Examples of the removable medium 1711 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1702, a hard disk included in the storage portion 1708, etc., in which the program is stored and which is distributed together with the apparatus including the same to the user.

It shall further be noted that the steps of the foregoing series of processes may naturally but not necessarily be performed in the sequential order as described chronically. Some of the steps may be performed concurrently or separately from each other.

Although the disclosure and the advantages thereof have been described in details, it shall be appreciated that various modifications, substitutions and variations can be made without departing from the spirit and scope of the disclosure as defined by the appended claims. Furthermore the terms "include", "comprise" or any variants thereof in the embodiments of the disclosure are intended to encompass nonexclusive inclusion so that a procedure, method, article or apparatus including a series of elements includes both those elements and one or more other elements which are listed explicitly or an element(s) inherent to the procedure, method, article or device. Without much more limitation, an element being defined by a sentence "include/comprise a(n) . . ." will not exclude presence of an additional identical element(s) in the process, method, article or device including the element.

The invention claimed is:

1. A device on base station side in a wireless communication system, comprising:
   a memory;
   circuitry connected to the memory and configured to:
   identify, according to information about user equipment received from the user equipment, edge user equipment on an enhanced physical downlink control channel (EPDCCH);
   apply an interference coordination scheme to the EPDCCH of the edge user equipment; and
      set, according to the applied interference coordination scheme, an enhanced control channel elements (ECCE) aggregation level candidate set smaller than an ECCE aggregation level candidate set used when the interference coordination scheme is not applied on the EPDCCH, for the edge user equipment, or
      set an ECCE aggregation level reduction for the edge user equipment, wherein the ECCE aggregation level reduction indicates a reduction in level as compared with the ECCE aggregation level being set when the interference coordination scheme is not applied on the EPDCCH.

2. The device on base station side according to claim 1, wherein the interference coordination scheme comprises at least one of a Coordinated Multipoint (CoMP) transmission scheme and an Almost Blank Subframe (ABS) scheme.

3. The device on base station side according to claim 2, wherein the CoMP transmission scheme further comprises at least one of Joint Processing and Coordinated Scheduling/Coordinated Beamforming, and
   wherein the circuitry is further configured to select and apply the CoMP transmission scheme according to a channel quality of a single cell where the edge user equipment is located and a predetermined channel quality determined based on a Quality-of-Service (QoS) requirement.

4. The device on base station side according to claim 1, wherein the circuitry is further configured to determine, according to improvement in a channel quality of the EPDCCH when applying the interference coordination scheme on the EPDCCH as compared with a channel quality when the interference coordination scheme is not applied, a degree of decrease of the ECCE aggregation level candidate set or the ECCE aggregation level reduction.

5. The device on base station side according to claim 1, wherein the circuitry is further configured to adjust the ECCE aggregation level for the edge user equipment according to a Quality-of-Service (QoS) requirement of the edge user equipment.

6. The device on base station side according to claim 1, wherein the circuitry is further configured to increase, for central user equipment other than the edge user equipment, the ECCE aggregation level according to a Quality-of-Service (QoS) requirement of the central user equipment.

7. The device on base station side according to claim 1, wherein the circuitry is further configured to:
   determine at least one coordinated cell according to a channel quality of the EPDCCH of the edge user equipment when each cell coordinates with a cell where the edge user equipment is located,
   set the ECCE aggregation level for the edge user equipment according to the determined at least one coordinated cell.

8. The device on base station side according to claim 7, wherein the circuitry is further configured to allocate EPDCCH space saved according to the ECCE aggregation level set for the edge user equipment to other user equipment in the cell where the edge user equipment is located or to user equipment in other cells.

9. The device on base station side according to claim 7, wherein the circuitry is further configured to notify the user equipment of the applied interference coordination scheme, information about the coordinated cell or the set ECCE aggregation level.

10. The device on base station side according to claim 1, wherein the circuitry is further configured to determine the edge user equipment according to a Quality-of-Service (QoS) requirement of the user equipment.

11. A device on user equipment side in a wireless communication system, comprising:
    circuitry configured to:
    send information about the user equipment to a device on base station side;
    receive, if the device on base station side determines the user equipment as edge user equipment according to the received information, information about an applied interference coordination scheme and a coordinated cell for a cell where the user equipment is located from the device on base station side;
    receive, from the device on base station side, an enhanced control channel element (ECCE) aggregation level candidate set which is smaller than an ECCE aggregation level candidate set used when the interference coordination scheme is not applied on the enhanced physical downlink control channel (EPDCCH), or receive an ECCE aggregation level reduction for the user equipment, wherein the ECCE aggregation level reduction indicates a reduction in level as compared with the ECCE aggregation level being set when the interference coordination scheme is not applied on the EPDCCH, and
    perform blind detection, according to the ECCE aggregation level candidate set or the ECCE aggregation level reduction, for control information on an EPDCCH received from base stations of the cell where the user equipment is located.

12. The device on user equipment side according to claim 11, wherein the circuitry starts in priority blind detection from an ECCE aggregation level lower than an ECCE aggregation level when the interference coordination scheme is not applied on the EPDCCH.

13. The device on user equipment side according to claim 11, wherein the circuitry is further configured to
    report a QoS requirement of the user equipment to the device on base station side to be used for determining the applied interference coordination scheme or the ECCE aggregation level for the user equipment.

14. A method for use in a wireless communication system, comprising:
    identifying, according to information about user equipment received from the user equipment, edge user equipment on an enhanced physical downlink control channel (EPDCCH);
    applying an interference coordination scheme to the EPDCCH of the edge user equipment; and
        setting, according to the applied interference coordination scheme, an enhanced control channel element (ECCE) aggregation level candidate set smaller than an ECCE aggregation level candidate set when the interference coordination scheme is not applied on the EPDCCH, for the edge user equipment, or
        setting an ECCE aggregation level reduction for the edge user equipment, wherein the ECCE aggregation level reduction indicates a reduction in level as compared with the ECCE aggregation level being set when the interference coordination scheme is not applied on the EPDCCH.

* * * * *